SHARPENERS FOR CUTTING REELS

Original Filed Dec. 4, 1967 4 Sheets-Sheet 1

INVENTORS
Wilmer E. Witt
Eugene A. Sousek
Clyde A. Clark

BY

Morsell & Morsell
ATTORNEYS

SHARPENERS FOR CUTTING REELS

Original Filed Dec. 4, 1967 4 Sheets-Sheet 2

INVENTORS
Wilmer E. Witt
Eugene A. Sousek
BY Clyde A. Clish

Morsell & Morsell
ATTORNEYS

SHARPENERS FOR CUTTING REELS

Original Filed Dec. 4, 1967 4 Sheets-Sheet 3

INVENTORS
Wilmer E. Witt
Eugene A. Smoak
Clyde A. Clish
BY
Morsell & Morsell
ATTORNEYS

SHARPENERS FOR CUTTING REELS

Original Filed Dec. 4, 1967 4 Sheets-Sheet 4

INVENTORS
Wilmer E. Witt
Eugene A. Sovacek
Clyde A. Clark
By
Marell & Marell
ATTORNEYS United States Patent Office Re. 28,200
Reissued Oct. 15, 1974

28,200

SHARPENERS FOR CUTTING REELS

Wilmer E. Witt, 1111 Greengrove Road; Eugene A. Sousek, 2113 N. Summit St.; and Clyde A. Clish, 1606 S. Madison St., all of Appleton, Wis. 54911

Original No. 3,638,363, dated Feb. 1, 1972, Ser. No. 46,192, June 15, 1970, which is a continuation of application Ser. No. 687,528, Dec. 4, 1967. Application for reissue Jan. 28, 1974, Ser. No. 437,060
Int. Cl. B24b *19/00*
U.S. Cl. 51—249 20 Claims

Matter enclosed in heavy brackets [ ] appears in the original patent but forms no part of this reissue specification; matter printed in italics indicates the additions made by reissue.

ABSTRACT OF THE DISCLOSURE

A rotatable grinding disk is supported on the frame of a cutting reel for movement in a straight line, back and forth across the knife cylinder assembly. It is also supported, in conjunction with a cover, for swinging movement into and out of operative position. There is means including a cam rod and mechanical linkages for transmitting rotary motion to the knife cylinder as the grinding stone progresses axially so that all portions of the cutting edge of an angled or helical knife are presented in proper sharpening relationship to the end face of the stone. There is also means for indexing the knife cylinder to present a new knife for sharpening after sharpening of one knife has been completed.

This is a continuation of application Ser. No. 687,528 filed Dec. 4, 1967.

BACKGROUND OF THE INVENTION

1. Field of the Invention

The present invention relates to a sharpener for rotatable cutting reels of the type having angled or helical knives and is particularly suited for permanent attachment to the cutting reels of forage harvesters.

2. Description of the Prior Art

To provide for the periodic sharpening of cutting reels, particularly of forage harvesters, it has heretofore been suggested to perform the sharpening operation on the reel in situ, that is, without removing the individual blades or the cutting reel as a whole from the harvester. According to one suggestion which has heretofore been made to that end, the reel housing is provided with a top opening and a sharpening stone is mounted on the reel housing so that it can be lowered through the opening into sharpening engagement with the reel and then moved back and forth axially of the reel from one end to the other. The coaction of the sharpening stone with the reel blades should be such that successive sharpenings of each blade do not change the bevel of its cutting edge. In order to accomplish this, it has heretofore been proposed to feed a rotary grindstone along each individual blade, but if the blades are helical or angled, as they usually are, provisions must then also be made to keep the cutting edge of each helical blade in proper sharpening engagement with the rotary grindstone as the latter is moved back and forth axially of the reel. To take care of this past-mentioned requirement, a linkage mechanism has heretofore been suggested which produces a partial rocking of the reel about its axis in response to linear movement of the grindstone axially of the reel. Such previously suggested linkage mechanism, however, is believed to have not been entirely satisfactory in various respects, particularly in the matter of bringing the reel into proper rotatively adjusted positions relative to the grindstone.

SUMMARY OF THE INVENTION

Generally, it is an object of the invention to provide an improved mechanism for sharpening the blades of a cutting reel in situ.

More specifically, it is an object of the invention to provide an improved reel-sharpening device of the above-mentioned character wherein a rotary grindstone is moved back and forth axially of the reel and the latter is rocked slightly back and forth on its axis in response to linear back and forth movement of the grindstone, so as to maintain proper sharpening engagement of the grindstone with helically curved or angled individual cutting blades.

ener as above-described having means for automatically

A further object of the invention is to provide a sharpener as above-described having means for automatically causing indexing of the cutter reel to bring a new knife into position after sharpening of one of the knives of the cutting reel has been completed.

A further, more specific object of the invention is to provide a sharpener wherein the grinding stone is carried directly on the end of an electric motor shaft, and wherein the motor and grinding stone are moved axially of the cutting reel during use, the sharpening being done by engagement of an end face of the rotating grinding stone with the knife as the stone and motor are fed axially.

A further, more specific object of the invention is to provide a sharpener in which there is cam means coupled with mechanical linkage for transmitting partial rotation to the knife cylinder automatically as the grinding stone is moved axially, and wherein the cam means is so shaped as to provide clearance for the right-hand tip of the knife edge as it meets the cutter bar.

A further object of the invention is to provide a sharpener which may be installed as a permanent part of a cutting reel assembly, and which is mounted for quick movement into sharpening relationship when sharpening is required.

A further object of the invention is to provide a sharpener which is mounted in a swingable frame for movement into and out of sharpening position, there being a cover hinged to said frame which is movable from a reel covering position, when the sharpener is on top and inactive, to an upright position during the sharpening operation.

With the above and other objects in view, the invention consists of the improved sharpener and all of its parts and combinations, as set forth in the claims, and all equivalents thereof.

BRIEF DESCRIPTION OF THE DRAWING

In the drawing, in which the same reference numerals designate the same or similar parts in all of the views.

DESCRIPTION OF THE PREFERRED EMBODIMENT

Figure 1:
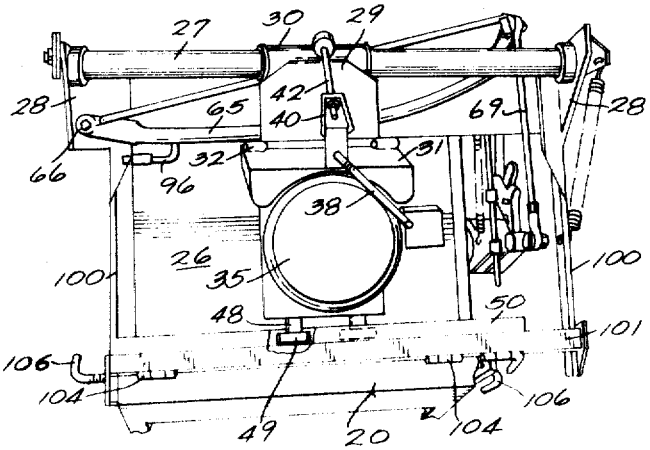
FIG. 1 is a perspective view looking principally from the top, showing the improved sharpener attachment as used on a cutting reel assembly of a forage harvester, the cover of the cutting unit being closed and the sharpener being outside of the cover so that it is inoperative for sharpening purposes.
Figure 2:
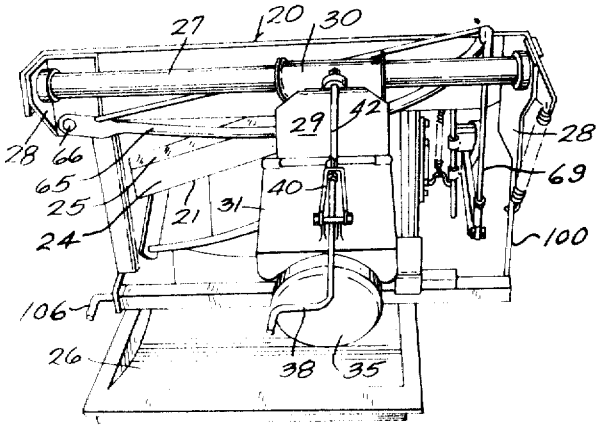
FIG. 2 is a perspective view also looking principally from the top, showing the sharpening device in operative position for sharpening and showing the cutting reel cover open and in a position to form a guard during sharpening.
Figure 3:
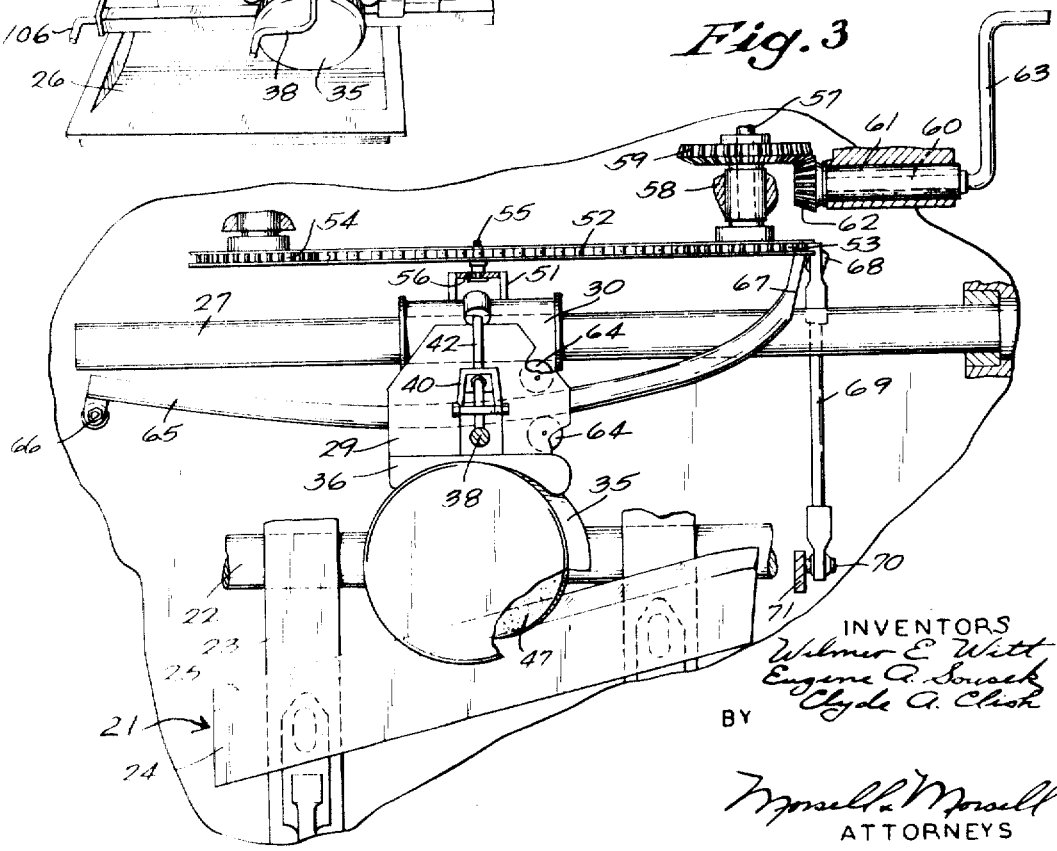
FIG. 3 is a fragmentary top view showing the grinding stone in engagement with one knife of the cutting reel, having moved about half of the distance axially of the cutting reel.

Referring more particularly to FIGS. 1–3 of the drawing, there is illustrated a cutter assembly of the type used in forage harvesters, and including a suitable frame 20 having a cutting reel 21 with a shaft 22 which is rotatably mounted in the frame, as is customary. The cutting reel includes a suitable spider 23 supporting helical knives 24, as shown in FIG. 2, usually six in number. The invention is also applicable to straight but angled knives as shown in FIG. 3, it being understood that the mechanism shown in FIG. 3 is suitable for use with either helical or straight angled knives. Each knife has a beveled cutting edge 25. A cover 26 is hingedly supported in a manner to be hereinafter described for movement from the closed position shown in FIGS. 1 and 12 where it acts as a guard during use of the cutting reel to the open position of FIGS. 2 and 15 where it is swung to upright position when the sharpener is in operative position for sharpening.

A guiding tube 27 has its ends suitably secured to extensions 28 of the head assembly (see FIG. 2). A motor-supporting carriage 29 has a tubular slide 30 connected to one of its sides which is slidably associated with the guiding tube 27 so that the table may be slidably moved axially of the cutting reel, as is clear from FIG. 2. As is also clear from FIG. 10, an upright motor support 31 is hinged as at 32 to the carriage 29. Any suitable means may be used to adjustably support the motor. As one example, the upright support has a rectangular slot 33 through which a lug 34 connected to the back of an electric motor 35 projects. The upper portion of the support 31 is shaped as at 36 to cradle the motor in the position shown in FIG. 10. Secured to the upper portion of the upright support 31 is a lug 37. A crank handle 38 has a threaded portion 39 in threaded engagement with the lug 37. Thus, when the handle 38 is cranked in one direction, it will pull up on the motor lug 34 and raise the motor, and when the crank is rotated in the opposite direction, it will lower the motor.

Figure 10:
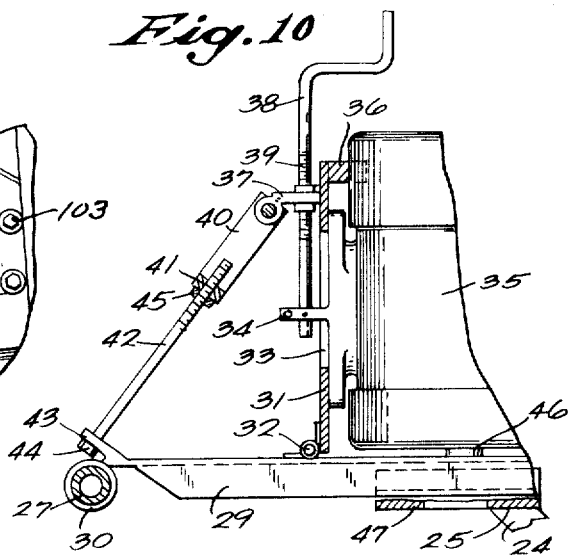
FIG. 10 is a fragmentary side elevational view of the sharpener carriage and motor support, the latter being shown in vertical section to illustrate adjustments for the position of the motor and cuttng stone.

Pivoted to the end of the lug 37 is one end of a clevis 40 (see FIG. 10). The other end of the clevis is closed and threaded as at 41 to receive a threaded end of an adjustment bolt 42. The latter projects upwardly at an angle from an ear 43 on the table 29 and has a head 44 on the underside of the ear. By rotating the bolt 42 in one direction or the other, the upright motor support 31 and motor may be pivoted in one direction or the other on the hinge 32 to adjust the angle of the motor. A locknut 45 may be employed to hold the adjustment.

The motor 35 has a depending drive shaft 46 projecting through a hole in the carriage table and carried on the lower end of the drive shaft is a grinding stone 47, the hole in the table being large enough to permit movement of the stone 47 therethrough. The end of the carriage table which is opposite the slide 30 may have projecting studs 48 carrying rollers 49 which travel in a channel guide 50 on the frame to thereby support and guide this end of the carriage 29 during travel of the carriage (FIG. 1 and FIG. 12).

Projecting from the tubular slide 30 of the motor carriage 29 (see FIG. 3) is a U extension 51. An endless chain 52 rotatable around sprocket wheels 53 and 54 has one of its link pins 55 projecting laterally, and one end thereof projects through and is pivoted in a vertical slot 56 of the bracket 51. The socket wheel 53 is mounted on a shaft 57 journaled in a suitable bearing 58, and the outer end of the shaft 57 carries a bevel gear 59. A crank shaft 60 is suitably journaled in a bearing 61 and carries on its end a bevel gear 62 which meshes with the bevel gear 59. When the crank handle 63 is turned, the endless chain 52 is driven and this will act through the projecting pin 55 to pull the motor carriage along the tubular guide rod 27, first to the left (referring to FIG. 3), and then as the pin 55 comes to the lower stretch of the endless chain 52, it will pull the carriage back again to the right. During the movement from the upper stretch to the lower stretch, the pin 55 will slide and pivot in the vertical slot 56 of the bracket 51. For simplicity of illustration, the crank and endless chain mechanism for moving the motor carriage has not been illustrated in FIGS. 1 and 2 but only in FIG. 3, but it is to be understood that it may be employed in the structure of FIGS. 1 and 2, or alternatively, the sharpening unit of FIGS. 1 and 2 may be pushed manually back and forth.

Figure 15:
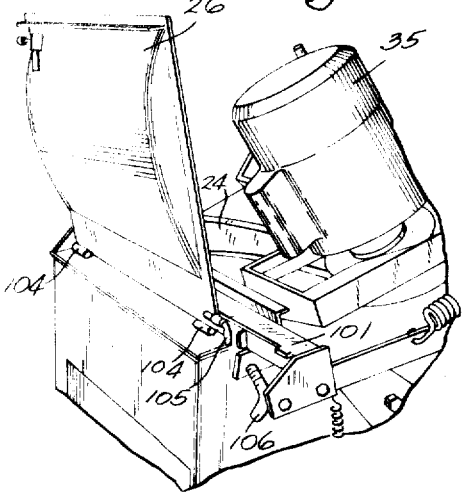
FIG. 15 is a perspective view showing the sharpener unit in operative position.

Pivoted to the underside of the table for the carriage 29, as shown in FIG. 3, are spaced cam follower rollers 64 which coact with a curved cam rod 65 constituting a control for the rocking movement. The latter has one end pivoted to the frame as at 66 and has its other end sharply curved as at 67 and pivoted as at 68 to one end of a link 69. The elements 64, 65 and 69 constitute motion transmitting means. The other end of the link 69 is pivoted as at 70 to the upper end of an actuator arm constituting a lever or indexing element 71 which operates the mechanism shown in FIGS. 4–9, inclusive, to be hereinafter described in greater detail. It is apparent from the above that as the motor carriage is moved axially of the cutting reel, upon operation of the crank 63, the cam follower causes pivoitng of the cam rod 65 on the pivot 66, with the resultant movement of the opposite end 68, causing corresponding movement of the link 69, which in turn transmits movement to the actuating arm 71 as dictated to by the curvature of the cam rod 65 which provides speed change mechanism. As before mentioned, the knife 24 shown in FIG. 3 is straight and angled. It may also be a helically disposed knife as shown in FIG. 2 and, as is common practice in cutting reels of the lawnmower type, there are usually six knives on a reel assembly. As shown in FIG. 3, the motor is so supported in the upright support that the axis of the motor and grinding stone are tilted approximately 5° toward the left (referring to FIG. 3). When the sharpening device is being used for sharpening, the cover 26 is in an upwardly swung position, as shown in FIGS. 2 and 15. After sharpening has been completed, a latch bolt 96 is withdrawn (FIG. 1) to release the cover, and the screws 106 which hold the swinging frame 101 in fixed position are loosened.

Figure 12:
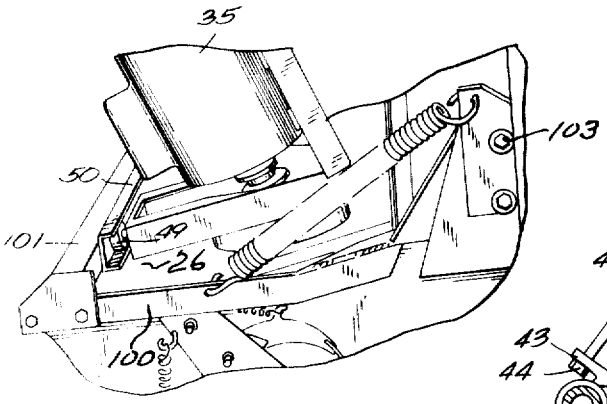
FIG. 12 is a fragmentary perspective view looking principally from the side showing parts when the sharpening apparatus is in inactive position on top of the cover.
Figure 13:
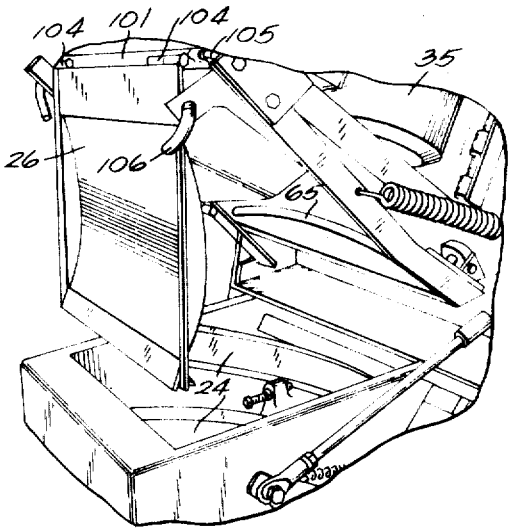
FIG. 13 is a perspective view looking principally from the side and front showing the sharpener frame swung partially upwardly and showing the cover in suspended position.
Figure 14:
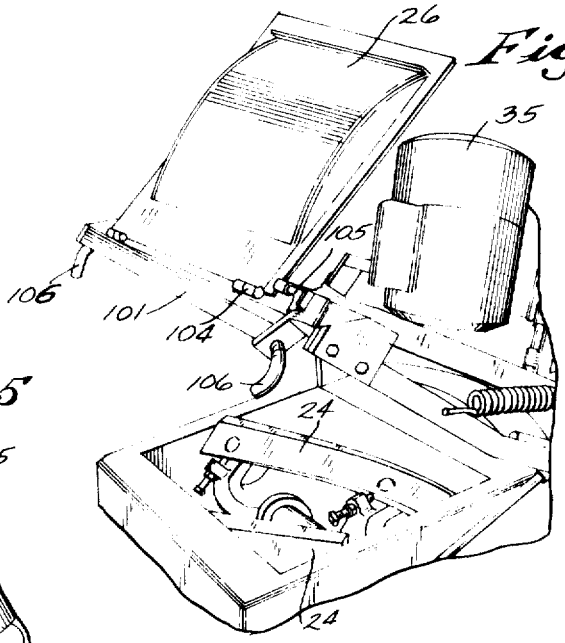
FIG. 14 is a perspective view showing the cover swung up from the suspended position of FIG. 13 to upright position.

The frame 101 has side arms 100, the inner ends of which are pivoted as at 103 so that the U-frame is swingable upwardly on the pivots 103 from the position of FIG. 12 to and beyond the position of FIG. 13. This picks up the cover 26, when the latter is on top of the reel during operation of the cutting reel, and causes the cover to be suspended by its hinges 104 as shown in FIG. 13. Thereafter the cover 26 is swung on said hinges to the upright position of FIG. 14, and the U-frame 101 is then lowered back to a position to bring the sharpening stone into the sharpening position of FIG. 15. When in sharpening position the screws 106 are again tightened to hold the U-frame rigidly to the frame of the reel unit. In addition, the bolt 105 is slid to the position shown in FIG. 15 to maintain the cover 26 in upright position and prevent its falling on top of the sharpening device. When in the position of FIG. 15, the cover functions as a guard during the sharpening operation.

After sharpening has been completed, the screws 106 are again loosened, the bolt 105 is slid to releasing position, and the U-frame 101 is swung up on its pivots 103 to approximately the position of FIG. 13. This permits the cover 26 to be flipped downwardly on its hinges 104 to the suspended position shown in FIG. 13. Thereafter the cover 26 is tucked under the U-frame 101, and the U-frame and cover are then lowered to the position shown in FIGS. 1 and 12 where the cover fits over the cutting reel to form a guard during cutting. Thereafter the bolt 96 (FIG. 1) is slid to locking position to lock the cover in position, and the bolts 106 are tightened to secure the U-frame in its lowered position.

THE KNIFE-POSITIONING AND INDEXING MECHANISM

Figure 11:
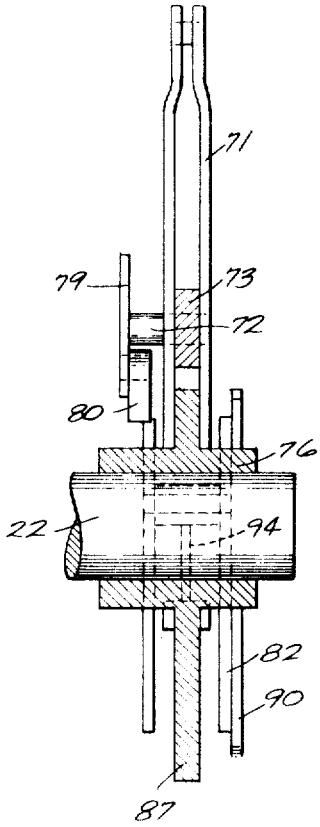
FIG. 11 is a fragmentary sectional view taken approximately on the line 11—11 of FIG. 6.

Referring now more particularly to FIGS. 4–9, inclusive, and FIG. 11, the actuator arm in the form of a lever or indexing element 71 is freely pivotal around the axis of the cutting reel shaft 22. Pivoted to the arm 71 intermediate its length as at 72 is a knife-positioning pawl 73 having a nub 74 which is shaped to fit into one of the recesses or notches 75 of a hub member 76, the latter being keyed to the shaft 22. The elements 73–76 constitute torque-transmitting elements. Linkage comprises a link 77 pivotally connected at one end as at 78 to the frame and at its other end to the outer end of a link 79. The link 79 is pivoted to the actuator arm 71 by the same pivot 72 which connects the pawl 73 to the actuator arm. An end of the link 79 which projects beyond the pivot 72 carries a pivotally mounted dog 80. An upper portion of the actuator arm 71 is connected by a spring 81 with a portion of the pawl 73 which is to the right of the pivot 72.

Freely pivoted around the axis of the shaft 22 for the cutting reel is a knife indexing frame 82 preferably formed of spaced plates. The indexing frame has a rigid projection 83 forming a crank arm for the frame which is connected by a spring 84 with the frame of the cutting assembly as at 85. Also pivoted between the plates of the indexing frame as at 86 is a knife indexing pawl 87 having a nub 88 shaped to fit in one of the notches 75 of the hub 76. Pivoted as at 89 to the outer side of the indexing frame is a safety arm 90. This arm is connected by a safety spring 91 to the indexing frame 82. A pawl depressor in the form of a leaf spring 92 projects from the end of the pawl 73 between the plates of the indexing frame 82, this depressor member having a curved end 93. Also pivoted between the plates of the indexing frame 82 is a dog 94. The lower end of the safety arm 90 is adapted to coact with a pin 95 on the dog 87.

OPERATION

Figure 4:
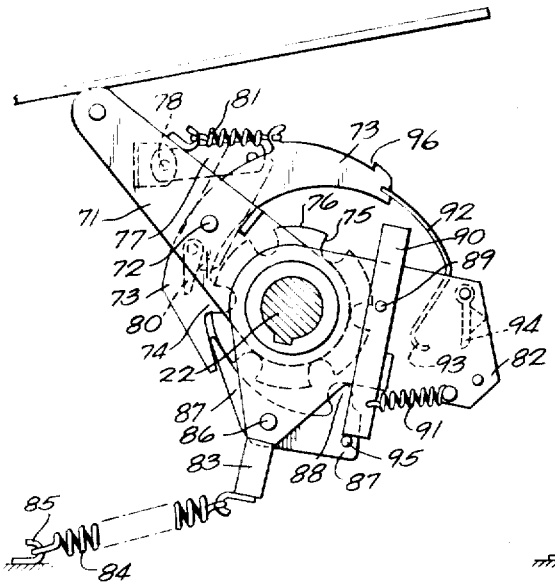
FIGS. 4–9, inclusive are partially diagrammatic views looking toward the end of the cutting reel showing the automatic reel-rotating and knife-indexing mechanism in various progressive stages during the sharpening operation.

In use of the improved sharpening device, the cover lock 105 is freed and the screws 106 are loosened. Then the U-frame for the sharpener is swung upwardly from the position of FIGS. 1 and 12, past the position of FIG. 13. Then the cover is swung upwardly to the upright position of FIG. 14 and the catch 105 is engaged to hold the cover 26 in the upright position of FIG. 14. This permits swinging of the frame and motor carriage down to the sharpening position of FIGS. 2 and 15. With the carriage at the extreme right-hand end of the cutting reel, and with the electric motor 35 in operation, the grinding wheel 47, which is cup-shaped as shown in FIG. 10, is in engagement with the beveled cutting edge 25 of one of the blades 24, as shown in FIG. 10. The knife positioning and indexing parts are in the position of FIG. 4. In this position the nub 74 of the knife-positioning dog 73 is in engagement with one of the notches 75 of the hub, as shown in FIG. 4. As the crank 63 of FIG. 3 is rotated to cause operation of the endless chain 52, this will move the motor and grinding wheel carriage slowly toward the left, referring to FIG. 3. As this occurs the curvature of the cam rod 65 causes clockwise movement of the actuating arm 71 (referring to FIG. 4). Due to the fact that the hub 76 is keyed to the shaft 22 of the cutting reel, as the arm 71 is swung to the right the cutting reel is partially rotated in a clockwise direction to compensate for the helical shape of the knife 24 and to always maintain the beveled portion 25 of the knife in the same relationship with the grinding stone shown in FIG. 10, regardless of the position of the grinding stone and motor in its progression axially of the cutting reel. Since the angle of the knives is from right to left, clearance is needed for the right-hand tip of the knife edge (referring to FIG. 3) as it meets the cutter bar of the cutting assembly. The right-hand end of the cam rod 65 is so shaped at 67 as to automatically provide this clearance in grinding, it serving to increase the rate of angular velocity of the indexing element 71 relative to the linear velocity of the carriage 29.

Figure 5:
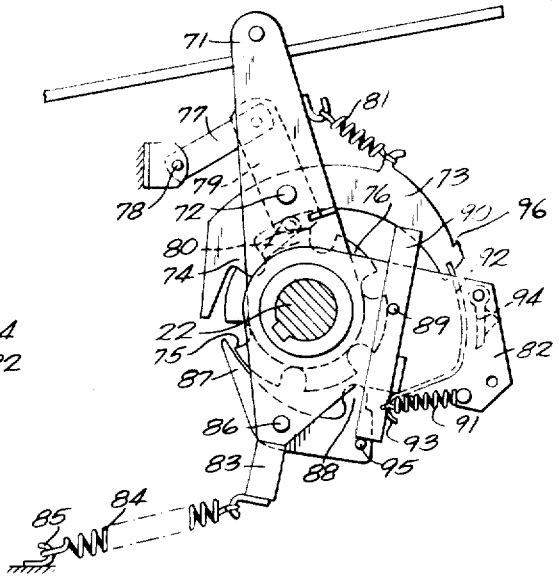
Figure 6:
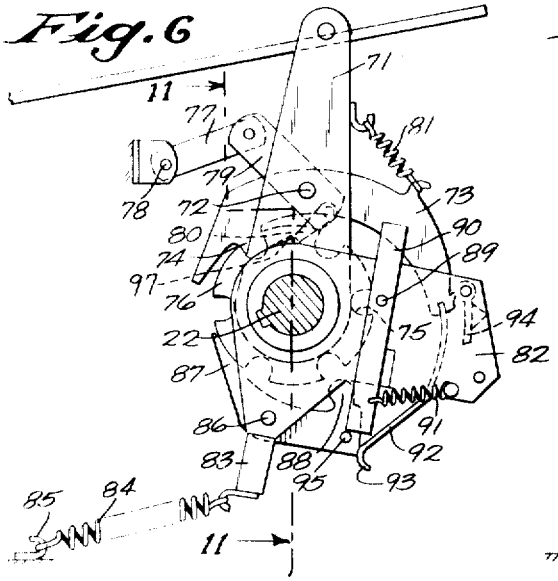
Figure 7:
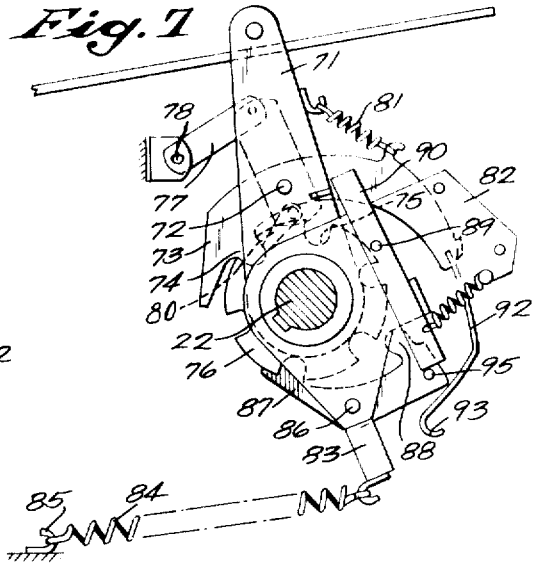

FIG. 5 shows the actuator arm near the end of its clockwise movement just before the grinding stone has completed its stroke from right to left (referring to FIG. 3). At the end of the clockwise stroke the dog 80 snaps behind a shoulder 97 on the indexing frame 82. As cranking of the handle 63 continues, the pin 55 of FIG. 3, which connects the carriage to the endless chain, travels down around the sprocket 54 to the lower stretch, sliding downwardly in the slot 56. This gives a desirable time delay before the carriage reverses its direction of movement which occurs as cranking continues. As such cranking continues the carriage will now start moving toward the right (referring to FIG. 3) and the shape of the cam bar 65 causes counterclockwise pivotal movement of the actuator arm 71. Due to the engagement of the dog 80 with the shoulder 97, the indexing frame 82 is now moved counterclockwise as shown in FIG. 7. During such movement the nub 74 on the pawl 73, which is still in engagement with one of the recesses 75 of the hub 76, is pushing the hub counterclockwise to reverse the reel rotation so as to still keep the beveled portion 25 of the blade in proper cutting relationship with the rotating grinding wheel 47. During the movement shown in FIG. 7 the spring 84 is being stretched. Also the hooked end 93 of the depressor spring 92 is in a position engaging a corner of the pawl 87 as shown in FIG. 7. The pawl, however, cannot pivot toward the hub because the safety arm 90 has its end engaging the pin 95 to prevent such movement.

Figure 8:
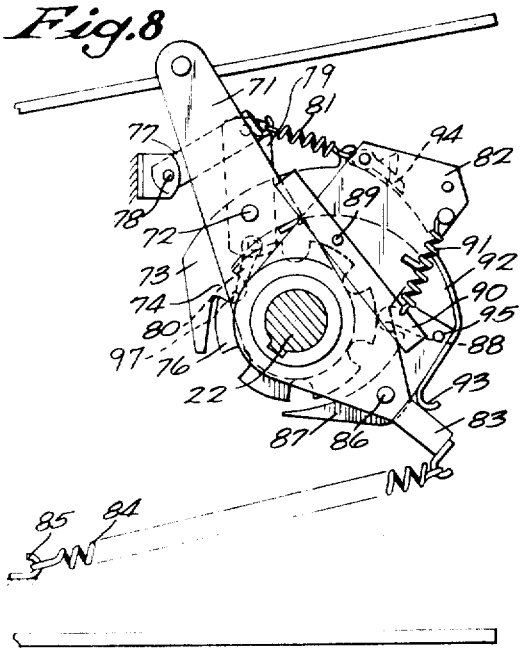
Figure 9:
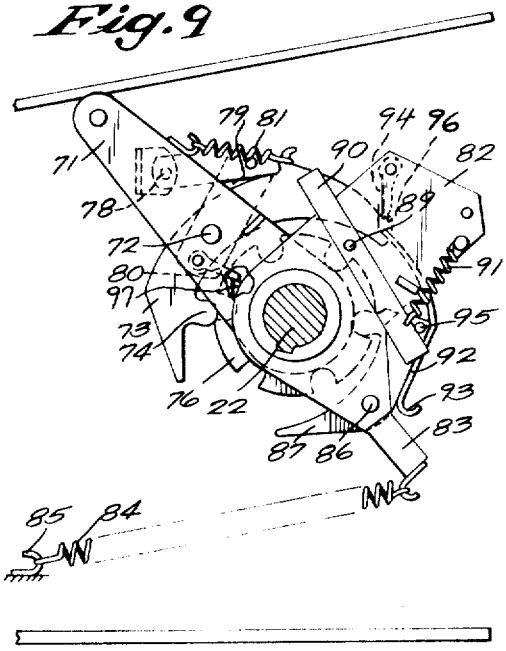

Referring now to FIG. 8, as counterclockwise movement continues the nub 88 of the pawl 87 is snapped by the movement illustrated in FIG. 8 the clevis forming the the cutting stone reaches the end of its return stroke, the parts now being in the position shown in FIG. 9. During the movement illustrated in FIG. 8 the clevis forming the indexing frame 82 moves faster because of the action provided by the linkage 77–79. This causes faster rotation of the reel near the end of the stroke to pull the 60° for indexing of the next knife.

In FIG. 9 the dog 80 flips past dead center to release the shoulder 97 on the indexing frame, and this allows the turning mechanism which includes the spring 84 to pull on the extension arm 83 and, due to the engagement of the nub 88 of the dog 87 with the hub recess, causes rotation of the hub and reel the necessary 60° to bring another knife into position to be sharpened. At the end of such action the nub 88 snaps out of engagement with the hub back to the position of FIG. 4. Thus the parts are again in the position to repeat the operation on the newly indexed knife of the cutting reel. During the counterclockwise indexing stroke, when the spring 84 is pulling on the arm 83 of the indexing frame, the dog 94 of the indexing frame is in engagement with a shoulder 96 on the right-hand end of the pawl 73, as shown in FIG. 9. As the indexing frame continues its clockwise movement the dog 94 snaps off of the shoulder, releasing the pawl 73 and allowing the spring 81 to pivot the pawl so that its nub 74 is again engaged with a recess 75 of the hub, as in FIG. 4, ready for sharpening of the next knife.

From the above it is believed clear that the improved sharpener markes it possible to efficiently employ a rotatable grinding stone with its end face engageable with the cutting edge of a blade to be sharpened, and that all portions of the edge of the helical blade are automatically maintained in proper edge sharpening relationship to the stone. It is also clear that there is means for automatically indexing the cutter reel to bring a new knife into position after sharpening of one of the knives has been completed. This latter feature, however, may be optionally employed, and it is to be understood that the means for automatically rocking the cutting reel as the grinding stone is fed axially is useful whether or not there is automatic indexing of the blades from one blade to another.

It is also clear that with the present invention the improved sharpening device may be a permanent part of a forage harvester or other implement, the novel swinging frame making it possible to readily shift the sharpening device into and out of operative position, there being a cover which is swingable with the frame to and from reel-covering position.

It is to be understood that in the claims the term "angled" as referring to a cutter blade means either a straight-angled blade as shown in FIG. 3 or a helically angled blade as shown in FIG. 2. Various other changes and modifications may be made without departing from the spirit of the invention, and all of such changes are contemplated as may come within the scope of the claims.

What we claim is:

1. In combination with a cutter assembly having a frame and having a rotatably mounted cutting reel provided with angled blades, each having a cutting edge, a sharpening stone, means including a carriage supporting said stone on the frame for movement axially of the reel in a position to engage and act on one of said blades thereof, a lever element, means for releasably maintaining the reel in a predetermined indexed relationship to said stone so that sharpening engagement of the stone with the same blade is continuously maintained as the stone moves from one end of a blade to the other, said last means including indexing mechanism operatively connecting said lever element to the reel, means between the carriage and lever element for causing automatic partial positive rocking movement of the reel in [response to] *accordance with* axial movement of the carriage, which movement is so limited in extent that the reel remains in said indexed relationship while the stone remains continuously in sharpening engagement with only one and the same blades as it travels from one end of said blade to the other, said last means including control mechanism between the carriage and [reel-rocking mechanism] *said lever element* whereby the rocking movement is so correlated with the carriage movement and angle of the blade that said angled blade is maintained in proper edge sharpening relationship with the stone as the stone is moved axially.

2. A combination as claimed in claim 1 in which the sharpening stone is rotatable and has a periphery and has end faces, and is so supported on the carriage that one of said end faces has sharpening engagement with the cutting edge of the blade operation.

3. In combination with a cutter assembly having a frame and having a rotatably mounted cutting reel provided with angled blades, each having a cutting edge; a sharpening stone, means including a carriage supporting said stone on the frame for movement axially of the reel in a position to act on a blade thereof, reel-rocking mechanism on said frame operatively connected to said reel for imparting positive partial roatating movement thereto, and means between said carriage and reel-rocking mechanism independent of the engagement between the stone and blade for causing positive automatic rocking movement of the reel in [response to] *accordance with* axial movement of the carriage so that the cutting edge of an angled blade is maintained in proper edge sharpening relationship with the stone, the means for causing automatic rocking movement of the reel including cam mechanism.

4. A combination as claimed in claim 3 in which the means for causing automatic rocking movement of the reel also includes lever mechanism between the cam mechanism and reel.

5. A combination as claimed in claim 3 in which said means for causing automatic rocking movement of the reel includes a cam bar pivoted at one end to the frame and having its other end connected to the reel-rocking mechanism, there being cam follower means on the carriage which engages said cam bar to cause pivotal movement of the latter as the carriage is moved axially.

6. A combination as claimed in claim 5 in which the cam bar has a sharp curve near said other end so that the sharpening action will provide clearance at the adjacent tip of a blade.

7. In combination with a cutter assembly having a frame and having a rotatably mounted cutting reel provided with angled blades, each having a cutting edge, a sharpening stone, means including a carriage supporting said stone on the frame for movement axially of the reel in a position to act on a blade thereof, means for releasably maintaining the reel in a predetermined indexed relationship with the stone for sharpening of one blade, reel-rocking mechanism on said frame operatively connected to said reel, means between said carriage and reel-rocking mechanism for causing automatic rocking movement of the reel in [response to] *accordance with* axial movement of the carriage so that the cutting edge of an angled blade is maintained in proper edge-sharpening relationship with the stone, and means between the automatic reel-rocking mechanism and the reel which is responsive to completion of a movement of the carriage along the length of a blade for automatically indexing the reel to bring another blade into position.

8. A combination as claimed in claim 1 in which the reel has a central shaft, and in which [the reel-rocking mechanism] *said lever element* includes an arm which is mounted on said shaft and projects radially therefrom.

9. In combination with a cutter assembly having a frame, having a cutter bar, and having a rotatably mounted cutting reel provided with angled blades, each having a cutting edge with a tip at one end which requires clearance with the cutter bar, a sharpening stone, means including a carriage supporting said stone on the frame for movement axially of the reel in a position to act on a blade thereof, reel-rocking mechanism on said frame operatively connected to said reel, and means between said carriage and reel-rocking mechanism for causing automatic rocking movement of the reel in [response to] *accordance with* axial movement of the carriage so that the angled blade is maintained in edge-sharpening relationship with the stone as the stone is moving axially, said last means including mechanism to increase the rate of velocity of rocking movement so that sharpening will provide said clearance at said tips of the blades.

10. A combination as claimed in claim 9 in which the means between the carriage and reel-rocking mechanism includes a cam bar extending generally axially of the frame and pivoted at one end thereto and having its other end connected to the reel-rocking mechanism, there being cam follower means on the carriage which engages said cam bar to cause pivotal movement of the latter as the carriage is moved axially, said cam bar having a sharp curve near said other end so that sharpening action will provide said clearance at the tips of the blades.

11. In combination with a cutter assembly having a frame and having a rotatably mounted cutting reel with a shaft and provided with spaced blades, each having a cutting edge, a sharpening stone, means including a carriage supporting said stone on the frame for movement axially of the reel in a position to act on a blade thereof, means for releasibly maintaining the reel in a predetermined indexed relationship with the stone for sharpening of one blade, and means responsive to completion of movement of the carriage along the length of a blade for automatically indexing the reel to bring another blade into position.

12. In combination with a cutter assembly having a frame and having a rotatably mounted cutting reel provided with blades, each having a cutting edge, a sharpening stone, means including a carriage supporting said stone on the frame for movement axially of the reel in a position to act on a blade thereof, and means between the carriage and reel responsive to return of the carriage to starting position after moving back and forth along one blade for automatically indexing the reel to bring another blade into position.

13. A combination as claimed in claim 12 in which the automatic indexing means includes ratchet and dog mechanism between said reel shaft and frame.

14. A combination as claimed in claim 1 in which the means for supporting the carriage includes an auxiliary frame pivotally connected to the cutter assembly in a position to move the sharpening stone into and out of operative position.

15. In combination with a cutter assembly having a frame and having a rotatably mounted cutting reel provided with angled blades, each having a cutting edge, a sharpening stone, means including a carriage supporting said stone on the frame for movement axially of the reel in a position to act on a blade thereof, reel-rocking mecahnism on said frame operatively connected to said reel for imparting positive partial rotating movement thereto, and means between said carriage and reel-rocking mechanism independent of the engagement between the stone and blade for causing positive automatic rocking movement of the reel in [response to] *accordance with* axial movement of the carriage so that the cutting edge of an angled blade is maintained in proper edge-sharpening relationship to the stone, the means for supporting the carriage including an auxiliary frame pivotally connected to the cutter assembly frame in a position to move the sharpening stone into and out of operative position, in which there is a cover hinged to the auxiliary frame for swingable movement to and from a position beneath the auixilary frame and over the cutting reel, said cover also being mounted for swinging movement to an upright position in front of the sharpening stone when the sharpening stone is being used, and means for supporting the cover in said upright position.

16. In a sharpening device for a cutting reel which is rotatably mounted in a housing and has a number of circumferentially spaced angled cutting blades, the combination of a carriage guided on said housing for back and forth movement axially of said reel, a grindstone mounted on said carriage for back and forth movement therewith, an indexing element pivotally mounted on said housing, motion transmitting means responsive to said back and forth movement of said carriage to swing said indexing element back and forth on its pivot center relative to said housing, and releasably interconnected torque transmitting elements secured to said reel and indexing element and operable to selectively determine rotatively adjusted positions of said reel in which said blades are presented. respectively, in edge-sharpening relation to said grindstone.

17. A sharpening device as set forth in claim 16 wherein said torque transmitting elements comprise a circumferentially notched hub secured to said reel, and a pawl element connected to said indexing element and selectively engageable with any one of a plurality of notches of said hub.

18. A sharpening device as set forth in claim 16 wherein said motion transmitting means includes a speed change mechanism responsive to movement of said carriage toward one end of said reel to increase the rate of angular velocity of said indexing element relative to the linear velocity of said carriage.

19. A sharpening device as set forth in claim 16 and further comprising a mechanism responsive to swinging movement of said indexing element into one of its end positions to automatically release said reel from said indexing element.

20. A sharpening device as set forth in claim 19 and further comprising a turning mechanism for said reel responsive to release of said reel from said indexing element to move another of said blades into edge-sharpening relationship with said grindstone.

References Cited

The following references, cited by the Examiner, are of record in the patented file of this patent or the original patent.

UNITED STATES PATENTS

| | | | |
|---|---|---|---|
| 2,279,798 | 4/1942 | Shelburne | 51—48 HE |
| 2,286,970 | 6/1942 | Maynard | 51—48 HE |
| 2,476,177 | 7/1949 | Bloom et al. | 51—249 |
| 2,479,776 | 11/1969 | Berg | 51—249 |

OTHELL M. SIMPSON, Primary Examiner

U.S. Cl. X.R.

51—48 HE